W. S. CAMPBELL.
DISPLAY STAND.
APPLICATION FILED OCT. 3, 1916.
1,231,490. Patented June 26, 1917.
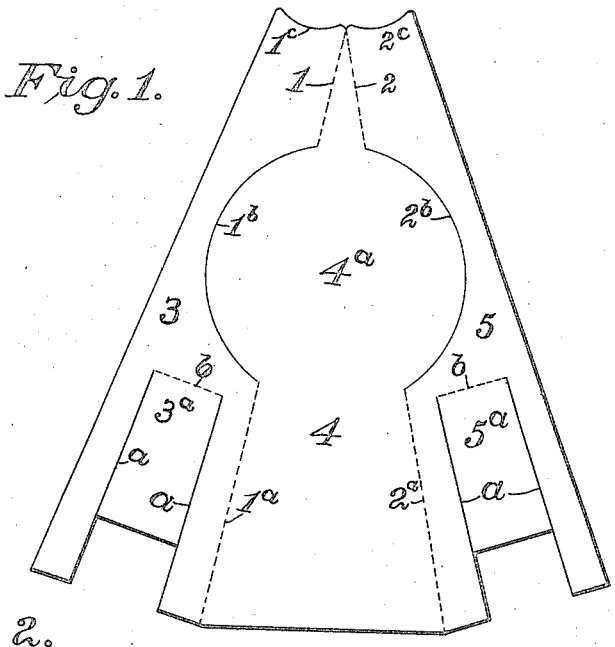
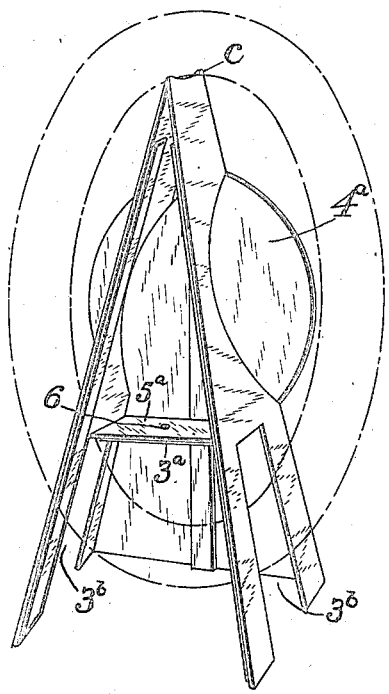
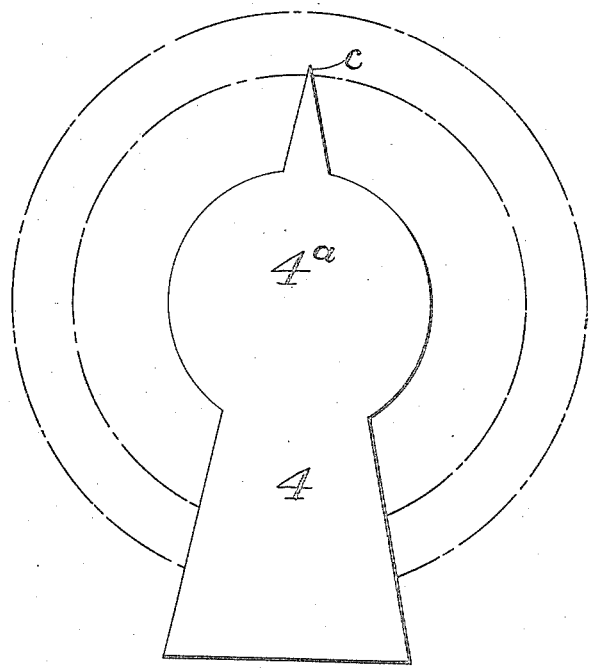
Inventor:
W. S. Campbell,
by Spear, Middleton, Donaldson & Spear
Att'ys.

UNITED STATES PATENT OFFICE.

WILLIAM S. CAMPBELL, OF AKRON, OHIO, ASSIGNOR TO THE MILLER RUBBER COMPANY, OF AKRON, OHIO, A CORPORATION OF OHIO.

DISPLAY-STAND.

1,231,490.                Specification of Letters Patent.      Patented June 26, 1917.

Application filed October 3, 1916. Serial No. 123,597.

*To all whom it may concern:*

Be it known that I, WILLIAM S. CAMPBELL, a citizen of the United States, resident of Akron, in the State of Ohio, have invented certain new and useful Improvements in Display-Stands, of which the following is a specification.

My present invention relates to an improved display stand for supporting an automobile tire in an upright position for exhibition purposes and has for its object to provide an extremely simple and economical form of stand which may be shipped in a knocked-down condition, readily set up in position to receive the tire, and which, by reason of its lightness, may be very easily handled.

The invention includes the novel features of construction hereinafter described and particularly defined by the appended claims.

An embodiment of my invention is illustrated in the accompanying drawings;

Figure 1 is a plan view showing the blank which is employed to produce my improved stand, and Fig. 2 is a perspective view of the stand in tire supporting position, the tire being indicated by dot and dash line.

Fig. 3 is a front view of the stand, in tire supporting position, the tire being indicated by dot and dash line.

In producing a tire stand according to my invention I cut from a piece of cardboard of suitable weight, such as 100 point stock, a blank of the shape shown in Fig. 1, to wit; of general triangular form.

This blank is scored as indicated by the dotted lines 1, $1^a$ and 2, $2^a$, the inner ends of the score lines 1, $1^a$ and 2, $2^a$ being connected respectively, by semi-circular cuts $1^b$, $2^b$. This divides the blank into three sections indicated at 3, 4 and 5, respectively, the sections 3 and 5 being capable of being folded back until they are parallel with each other and at right-angles to the section 4, which section 4 carries the circular portion $4^a$, the rounded sides of which are cut in part from the sections 3 and 5 and left in the plane of the front section when the side sections are folded back.

When the side sections are folded back the upper edges thereof, indicated at $1^c$ and $2^c$ are brought into proximity or contact with each other and, as they are curved, will form a concaved seat for the tire, as indicated at $c$ in Fig. 2.

To hold the sides 3 and 5 properly braced and in parallelism I provide said sides 3 and 5 with portions $3^a$, $5^a$, capable of being folded inward and upward and into the position shown in Fig. 2, wherein they are shown as secured together by a rivet 6, which is representative of any securing means. These portions or tongues $3^a$ and $5^a$ are formed by parallel slits $a$ and the folding is facilitated by lines of scoring, indicated at $b$. The spaces $3^b$ left in the sides 3 and 5 by the bending up of the tongues permits the lower portion of the tire to rest therein or pass therethrough so that the tire is sustained against swinging by the side portions and is supported at its top by the seat $c$.

The circular portion $4^a$ occupies the open center of the tire and affords a convenient place for advertising matter.

What I claim is:—

1. A tire supporting stand comprising a substantially tri-angular sheet of material folded to produce a substantially pyramidal stand, said stand having a tire supporting seat at the top and the sides of the stand having cut-away portions for the passage of the tire.

2. A tire supporting stand comprising a substantially tri-angular blank of sheet material folded on divergent lines to produce a substantially pyramidal support, the sides of said support having integral tongues formed by slitting said sides from the bottom upwardly, said tongues being bent upwardly into overlapping position and secured together to form braces for the sides.

WILLIAM S. CAMPBELL.

Witnesses:
C. A. WOLF,
C. E. ROBERTS.